(No Model.)

C. L. COFFIN.
METHOD OF HEATING METALS ELECTRICALLY.

No. 522,151. Patented June 26, 1894.

WITNESSES
Denton Guinness
Amelia Williams

INVENTOR
Charles L. Coffin.

UNITED STATES PATENT OFFICE.

CHARLES L. COFFIN, OF DETROIT, MICHIGAN.

METHOD OF HEATING METALS ELECTRICALLY.

SPECIFICATION forming part of Letters Patent No. 522,151, dated June 26, 1894.

Application filed November 16, 1893. Serial No. 491,136. (No model.)

*To all whom it may concern:*

Be it known that I, CHARLES L. COFFIN, of Detroit, in the county of Wayne and State of Michigan, have invented a new and useful Improvement in Methods of Heating Metals Electrically, of which the following is a specification.

This invention has for its object to provide a new and improved method of heating metals electrically.

To accomplish this object my invention consists in heating the metal, connecting it with one terminal of a generator of electricity, bringing it in contact with a liquid electrode connected with the other terminal of said generator, and establishing a voltaic arc between the two electrodes.

The invention also consists in heating the metal previous to its immersion in a liquid electrode, connected to one terminal of a source of electric energy, the said metal being connected to the other terminal of the source of electric energy, and establishing a voltaic arc between the electrodes.

The invention also consists in dipping a heated piece of metal into a liquid, passing an electric current through said metal and liquid, and establishing a voltaic arc between the electrodes.

The invention may be carried into effect by the apparatus illustrated in the accompanying drawings, in which—

Figure 1:
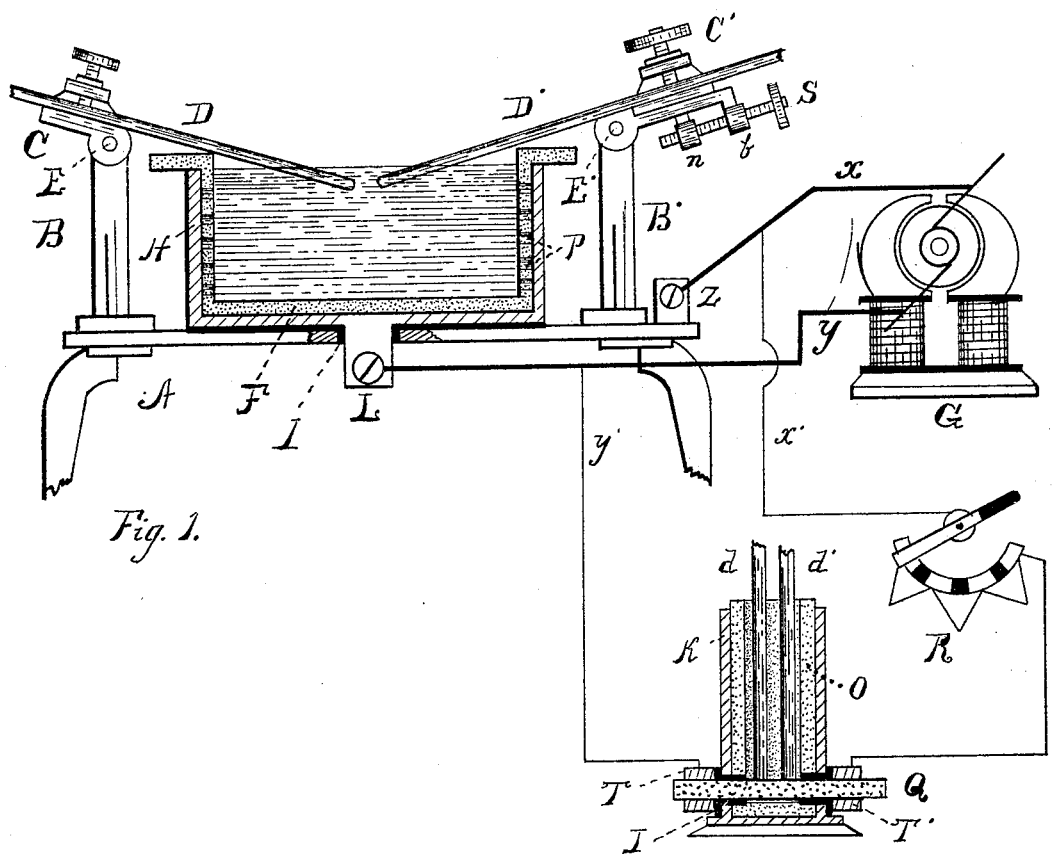
Figure 2:
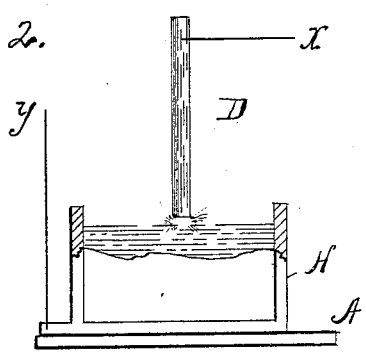
Figure 3:
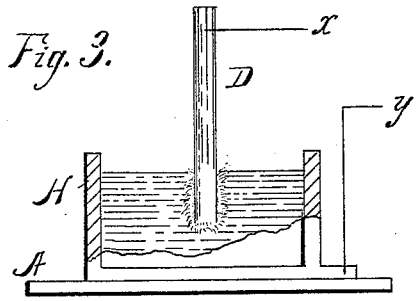

Figure 1 is a sectional elevation of the apparatus; and Figs. 2 and 3 are detail views hereinafter explained.

I have discovered that if a heated metal electrode connected with one terminal of an electric generator, be so introduced into a liquid electrode connected with the other terminal of the generator, a number of minute voltaic arcs will be formed between the two electrodes, and the metal electrode will become rapidly heated. Since the date of my discovery, other parties have proposed to heat a metal electrode by dipping the same into a liquid electrode, under the supposition that by means of the electrolytic action, hydrogen gas gathers on the metal electrode, and thus by the high resistance of this gas, a heating effect is produced, but I believe that this is a mistaken idea. Thus, if a metal electrode be placed in a liquid electrode, and the current then turned on, while hydrogen gas will be evolved in considerable quantity, little or no heat effect will be produced, but if the metal electrode be first heated to, or over, the boiling point of water, so that when put into the liquid, a film of vapor will be formed around the metal electrode, a number of minute voltaic arcs will be sprung between the two electrodes, and the metal electrode will become rapidly heated. Or if, the current being turned on, the metal electrode be brought in contact with the liquid electrode, and then withdrawn to form a voltaic arc between it and the liquid electrode, the metal electrode may be then, after becoming heated, immersed in the liquid electrode, and a number of minute voltaic arcs will be formed.

A represents an insulated support carrying a tank H, adapted to contain fluid, which tank, or, if preferred, the liquid within the tank, is connected by a conductor $y$ with one terminal of a generator of electricity.

B represents a support for a metal electrode D, which may be held in a clamp C pivoted at E to support B, so that said electrode D may be dipped into the fluid in said tank H, to establish the arc.

As shown in Fig. 1, tank H may be formed of a metal vessel P, lined with a porcelain or other suitable lining F, and provided with a lug and binding screw L for connection with conductor $y$. If desired, a second support B' carrying a clamp C' pivoted at E' to carry an electrode D' may be used, in which case it is well to make clamp C' longitudinally movable by screw shaft S, threaded nut $b$ and collar $n$ as is well understood. By perforating lining F the fluid comes in electrical contact with tank H. Where the two electrodes D D' are used they both become hot and might be welded together.

I represents insulating material.

For the purpose of heating the metal electrode, a carbon Q provided with metal connections T T' may be included in a high resistance shunt circuit $y'$ $x'$ and one or more electrodes represented by $d$ $d'$ may be placed in a receptacle K preferably lined with insulating material O, so that their ends will rest on carbon Q and therefore become heated before being used.

As shown in Fig. 2, the electrode D has been brought in contact with the liquid in tank H, and then withdrawn to form a voltaic arc between the two electrodes, for the purpose of heating electrode D, after which it may be partially immersed in the liquid electrode, as shown in Fig. 3, still maintaining the voltaic arcs.

As illustrated in Fig. 1, the electrode D or electrodes D D' are first heated until their ends are at the boiling point of water, or above that, and this may be done in the way shown in Fig. 1, or in any other suitable way. The current then being established, by partially immersing electrode D into the liquid in tank H, a number of minute voltaic arcs will be formed between the two electrodes, and electrode D is rapidly heated.

As shown in Figs. 2 and 3, the electrode D after the current has been established, is brought in contact with the liquid in tank H, and then slightly withdrawn, to form a voltaic arc, and when the end of the electrode D has become heated, it is slowly immersed in the liquid electrode, the voltaic arcs being continued between the two electrodes, and becomes rapidly heated. This process may be carried on with either alternating or continuous currents. With a continuous current it is preferable, though not essential, to connect the metal electrode with the negative terminal of the generator.

The liquid electrode may be a solution of soda carbonate, potassa carbonate, soda or potash nitrate, salt, borax, caustic soda or potash, &c., or an acid, alkaline, or neutral salt.

What I claim as my invention, and desire to secure by Letters Patent, is—

1. The herein described method of electrically heating metal, consisting in heating the metal, connecting it with one terminal of a generator of electricity, bringing it in contact with a liquid electrode connected with the other terminal of said generator, and establishing a voltaic arc between the two electrodes.

2. The herein described method of electrically heating metal consisting in heating said metal previous to its immersion in a liquid electrode, connected to one terminal of a source of electric energy, the said metal being connected to the other terminal of the source of electric energy, and establishing a voltaic arc between the electrodes.

3. The herein described mode of heating metal electrically consisting in dipping a heated piece of metal into a liquid, passing an electric current through said metal and liquid, and establishing a voltaic arc between the electrodes.

CHARLES L. COFFIN.

Witnesses:
DENTON GUINNESS,
AMELIA WILLIAMS.